March 25, 1969  J. H. SCHROEPPEL ET AL  3,435,184
PARALLEL GAP WELDING
Filed July 12, 1965
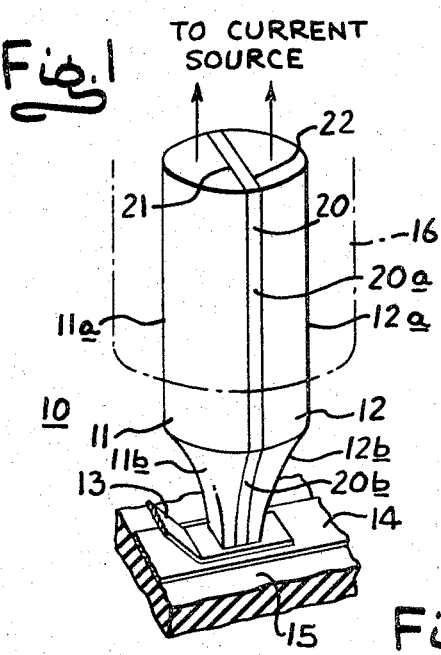
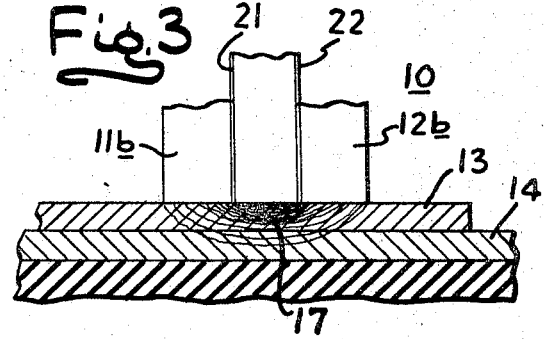
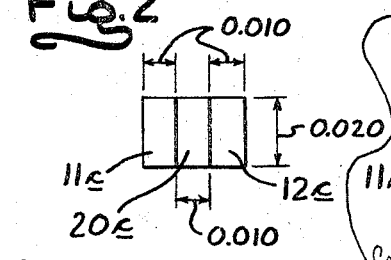
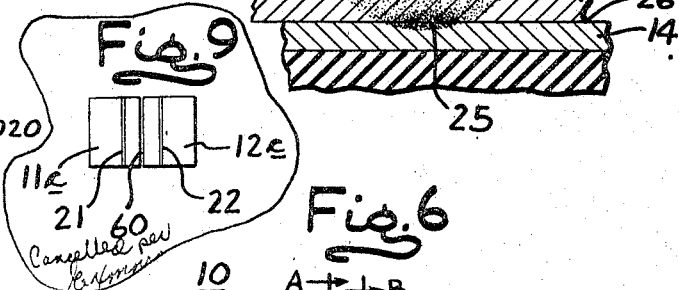
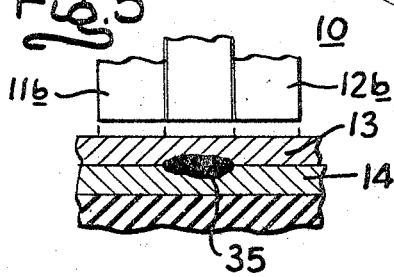
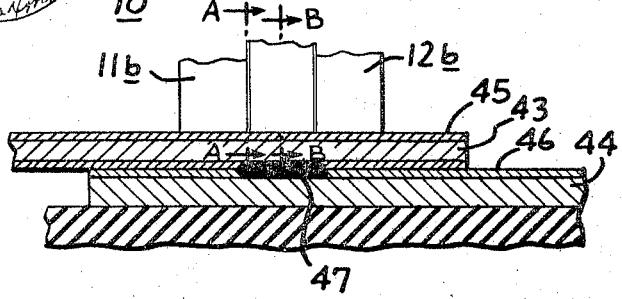
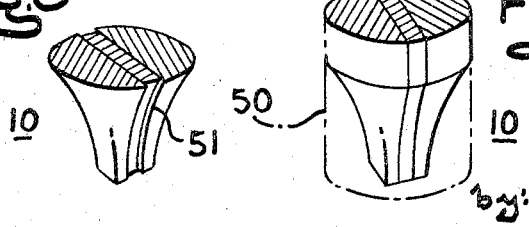
INVENTORS
JOHN H. SCHROEPPEL
RAYMOND L. McGAUGHEY
by Louis Altman
ATTY.

United States Patent Office 3,435,184
Patented Mar. 25, 1969

3,435,184
PARALLEL GAP WELDING
John H. Schroeppel, Lemont, and Raymond L. McGaughey, Dundee, Ill., assignors to General Time Corporation, New York, N.Y., a corporation of Delaware
Filed July 12, 1965, Ser. No. 471,344
Int. Cl. B23k 9/24, 11/30, 11/10
U.S. Cl. 219—119                                  3 Claims

ABSTRACT OF THE DISCLOSURE

A welding electrode construction for parallel gap welding in which the individual electrodes, arranged side by side, have a central layer of good conducting metal filling the space between them, the central layer being intimately bonded to the electrodes to provide electrical insulation with good thermal transfer and with the presented faces of the electrodes and central layer in the same plane for simultaneous intimate contact with the workpiece.

---

In the field of miniaturized electronics it is preferred to weld components or connections together rather than to employ solder. A typical problem is the making of an electrical connection between a conductor on an etched circuit board and a terminal of a component mounted on the board, which component may, for example, be a small integrated circuit subassembly having terminals in the form of flat strips of metal, on a miniature scale, extending from the periphery thereof. The parts are welded, in conventional practice, by flowing current through two welding electrodes spaced side by side on the strip terminal, the electrodes being from one to a few hundredths inch in each dimension and spaced a few hundredths of an inch apart. The welding current is applied in the form of a pulse of direct current having a predetermined duration and energy contact with the hope and expectation of fusing together the terminal strip and the etched strip at the plane of the junction and more or less centered between the electrodes.

However, it is found that such welding occurs more satisfactorily in theory than in practice, and a nonreliable weld may be produced setting the stage for an equipment failure, which is particularly intolerable in the case of equipment failure, which is particularly intolerable in the case of equipment intended for space or military usage. Where the energy content of the pulse is increased in an effort to produce a more well defined "nugget" at the junction, there is risk of severe damage to the parts. Thus where the welding pulse is applied over a relatively long period of time the substrate may be damaged or the bond between the etched strip and substrate may be loosened. Where the pulse length is shortened in an effort to reduce the time available for heat transfer, the surface member is often overheated resulting in expulsion of metal with almost explosive effect so that the integrity of the terminal is lost. Thus efforts have been made to arrive at an optimum energy content and duration for particular terminal materials and for particular welding electrodes. However, the optimum condition is difficult to achieve, is highly critical, and is affected by normal variations in the workpieces from one piece to the next. Moreover, where one is successful in establishing an optimum pulse for one set of conditions, the entire situation is changed when there is a change of material or plating of one or both of the members or a slight change in dimension in either width or thickness of one or both of the members. The thickness of the plating with a good conducting metal such as gold has a critical effect upon the success of the operation.

Accordingly, it is an object of the present invention to provide a welding electrode assembly for parallel gap welding which makes the welding conditions relatively less critical and which permits a sound weld to be secured time after time even in the face of variations normally encountered in the workpieces of a production line. More specifically it is an object of the present invention to provide a welding electrode construction in which the region of high temperature tends to be localized at the junction between the two strips to be connected to produce a sound and reliable weld at the junction.

It is another object related to the foregoing to provide a welding electrode construction intended for welding miniaturized circuit boards and the like which permits the temperature to be elevated to the desired degree at the point of the weld but in which the substrate material, forming the body of the circuit board, remains substantially intact and with the bond between the conductor and the board unimpaired.

It is still another object of the invention to provide a welding setup and electrode construction which may be used with a wide variety of metals having a wide range of conductivity, heat capacity and thermal coefficient and which is therefore especially suited for use under circumstances previously considered "difficult" where electrodes of conventional type are used. Thus it is an object to provide a welding setup and electrode which is capable of securing reliable electrical contact with extremely thin conductors on a circuit board, for example a conductor formed of evaporated gold having a thickness of less than 0.0001". Thus the present electrode and procedure may be used for securing terminals to a so called "microcircuit" or "integrated circuit" assembly.

While the present electrodes and procedure have particular application to the welding of metals, it may be noted that the electrodes are not limited to welding in the usual sense. For example where a least one of the members to be connected is plated with gold at the region of the junction the gold may fuse before the members themselves, thus establishing electrical contact by what may be termed "gold brazing." In short, in the present application and in the claims the term "welding" will be considered to refer to the melting or fusing of metal at a junction to establish a joint which is both electrically and mechanically sound, regardless of the presence or absence of a third metal at the junction between the members which are to be connected.

Other objects and advantages of the invention will become apparent upon reading the attached detailed description and upon reference to the drawings in which:

FIGURE 1 is a perspective view of a composite electrode constructed in accordance with the present invention and intended for parallel gap welding.

FIG. 2 is an enlarged face view of the electrode structure shown in FIG. 1.

FIG. 3 is a diagrammatic representation of the current density in the parallel workpieces under typical welding conditions.

FIG. 4 is a diagram showing the heat concentration and distribution during a weld utilizing the improved electrode assembly.

FIG. 5 shows the resultant welding nugget at the junction between the workpieces.

FIG. 6 is a view similar to FIG. 5 but shows the invention applied to workpieces having an interposed fusible layer.

FIG. 7 shows the removal of material to form the tip.

FIG. 8 shows the use of a preshaped central layer.

While the invention has been described in connection with a preferred embodiment, it will be understood that we do not intend to be limited to the particular embodiment shown but intend to cover the various alternative and equivalent constructions included within the spirit and scope of the appended claims.

Turning now to the drawing, FIG. 1 shows a typical welding setup used in the welding of components to circuit boards in which a composite electrode 10 is made up of electrodes 11, 12 used to weld a strip 13, which may be a terminal of an electrical component, to a conductive strip 14. The latter is bonded to a circuit board or substrate 15. In the case of the usual "printed circuit" board the strip 14 is defined by etching away the unwanted conducting material. Suitable means (not shown) are provided for connecting the two electrodes 11, 12 to a source of current having controls for controlling the duration and energy content of the welding pulse. In use the electrode assembly may be mounted in a chuck or holder 16 indicated by the dot-dash outline, preferably in good thermal contact with the electrodes to prevent accumulation of heat during continued usage. The specific design of chuck is a matter well within the skill of the art and will vary according to the machine in which the electrode is to be used.

Considering in greater detail the construction of the two electrodes 11, 12, the electrode 11 has a body portion 11a of generally "D" shaped cross section having an outer cylindrical surface and a tip portion 11b which converges conically to a welding face 11c. The companion electrode 12 is a mirror image of the latter and similar reference numerals have been used for identification. The faces 11c, 12c lie in the same plane and define a common welding face having a profile which is preferably rectangular and which is shown, greatly enlarged, in FIG. 2.

When the tip of the electrode assembly is brought into contact with the superimposed conducting strips 13, 14, and the current is applied, the current tends to follow an arcuate path as shown, in cross section, in FIG. 3, with the current being concentrated in the region of the shortest path, as indicated at 17 adjacent the surface of the conductive strip 13.

In accordance with the present invention the space between the two electrodes 11, 12 is filled by a layer of metal 20 having good thermal conductive properties with bonding layers 21, 22 providing electrical insulation but sufficiently thin so as to offer only slight resistance to the flow of heat from the central layer outwardly into the two electrodes. The central layer 20 has a body portion 20a and a tip portion 20b of narrowed cross section to form a smooth continuation of the outer surfaces of the two electrodes 11, 12. The tip portion of the central layer is continued downwardly to form a face 20c which lies in the same plane as the faces 11c, 12c of the electrodes to establish thermal coupling to the strip being welded. The material forming the layer 20 may, for example, be copper or aluminum.

As a result of using the central layer 20 a heat flow condition, and temperature distribution, are established as set forth in the diagram of FIG. 4. In this diagram the density of the stippling indicates the temperature and it will be noted that the temperature tends to be highest at a region 25 which is generally alined with the junction 26 between the two parallel workpieces and at a region which is centered with respect to the tips 11b, 12b of the two electrodes. Observations show that the presence of the central layer 20 does not increase the "penetration" of the current shown at 17 in FIG. 3; on the contrary, the superficial current tends to be increased. However, heat resulting from the superficial flow of current between the electrodes is conducted upwardly along the paths indicated by the arrows 30, 31 and 32. Because of the low thermal resistance provided by the bonding layers 21, 22 any tendency toward a temperature buildup at the tip of the central layer is prevented by immediate conduction of the heat laterally, as shown, as well as upwardly into the thicker portions of the welding tip and into the relatively massive body 11a, 12a. The flare in the tip insures that substantial heat transfer area is available within a short distance of the end face.

With the superficial temperature thus kept at a safety low level, the energy content of the pulse may be increased as necessary to insure that melting and fusion occur at the junction region 25 resulting in a weld "nugget" indicated at 35 in FIG. 5. Since the temperature drops below the fusing point promptly upon termination of the pulse, the electrode assembly may be lifted clear without delay and shifted into position for a successive weld at a different point on the circuit board. Because of the constant subtraction of heat from the welding tip to the body of the welding electrode assembly, via the interposed layer 20, there is no harmful temperature buildup at the tip and if the electrode assembly is thermally coupled to a more massive, or artificially cooled, chuck, rapid cycling on a continuous basis is entirely feasible.

The above described electrode assembly is particularly suitable for use in miniaturized form upon miniaturized circuit components. Thus in the case of a typical copper clad circuit board the conductor 14 may have a thickness on the order of 0.002" to 0.003" and the strip to be secured thereto may have a thickness of, say, 0.03" to 0.004". Under such circumstances the faces of the individual electrodes may be limited to a dimension of, say, 0.010" by 0.020" and the central layer may have a thickness of 0.010", producing a composite electrode face 0.020" by 0.030". These dimensions may be varied without departing from the invention. However, it is desirable for the radial thickness of the electrode, taken through the center, to be of the same order of magnitude as the thickness of the central layer, i.e., where the centrale layer has a thickness of one to a few hundredths of an inch, the electrode face should have a thickness measured radially of one to a few hundredths. Moreover, it is found desirable in practicing the invention for the stock of which the assembly is formed to have a cross section which is more than fifty times as great and preferably one hundred or more times as great as the area of the welding face. The contact force effective during the welding cycle may be on the order of 3 pounds which corresponds to a per unit pressure of 5,000 pounds p.s.i. This is sufficient to achieve good electrical and thermal contact. While the energy content of the welding pulse may be varied as necessary to produce fusion at the junction, in circuit board practice this may be achieved by use of only 0.04 watt-seconds of energy.

It is one of the features of the present invention that the period during which the current is applied may be safely shortened beyond that which may be tolerated where separate, conventional electrodes are employed. The desirability of using a short welding interval thereby to limit the time during which heat can spread through the workpieces and into the substrate has been recognized in the past. However, use of extremely short time intervals has resulted in "expulsion" of the surface metal between the electrodes oftentimes destroying the integrity of the weld and producing an objectionable pit in the upper layer. It has been difficult in the past to control the energy content and duration of the welding pulse to a point just below that at which expulsion may occur. Using the present composite electrode expulsion is effectively overcome, and it is found that energy content, wave shape, and duration of the pulse may all be varied over safely wide limits while still insuring a sound weld.

In the above discussion it has been assumed that the conductive strip 14 on the circuit board is of copper and that the terminal strip 13 is of any metal conventionally used for termination. It is a further feature of this invention that successful welds may be made using a wide variety of metals and metal alloys having a wide variety of thermal and electrical characteristics. For example, one or both of the conducting strips 13, 14 may be made of copper, of an alloy known in the trade as "Kovar," a combination of Kovar and nickel, or the like. In the past in an effort to secure a sound weld, Kovar has been specified as the cladding material for the circuit board. However, such material is relatively difficult to bond to an insulating board, and boards using Kovar as the conducting material are much more expensive than boards employing copper. One practical effect of the invention therefore is to permit general use of inexpensive and readily available copper clad boards. Generally speaking, the present invention makes it possible to use conductors of low electrical resistance which may be provided in relatively thin sections. As an extreme case the present electrode assembly may be successfully used in the welding of a terminal strip to a conductive path formed of evaporated gold deposited upon a suitable substrate in an extremely thin layer, for example, a layer of only 0.001" or even less. Since extremely thin gold conductors are commonly used in integrated circuitry, the present invention is particularly well suited for use in terminating integrated circuits, i.e., providing connections to other more massive circuit elements with which the integrated circuit is used.

Where the improved electrode assembly is used with plated strips, for example, strips which are gold plated, the energy content of the welding pulse may be adjusted to produce fusion of the gold to establish a sound electrical and mechanical connection between the parts without requiring fusion of the base metal. Thus referring to FIG. 6, the electrode 10 is shown in contact with a pair of superimposed strips 43, 44 each having a layer of gold, 45, 46 respectively, which may, in a typical case have a thickness of 0.0001" or less. Here again the specifical temperature in the member 43 is kept at a low point by reason of the composite electrode, with the temperature at the junction rising to the point of fusion so that the two layers are fused together in the region 47. The latter type of joint is sometimes referred to in the art as "gold brazing." The fusible material need not be gold and use of the composite electrode permits the materials and thicknesses to be varied over wide limits while still achievng a successful result. Also, the braze region 47 may even extend a substantial distance under the two electrodes.

In accordance with one of the more detailed aspects of the invention, a novel procedure has been devised for fabricating the eletcrode assembly shown in FIGURE 1. This procedure involves bonding, between a pair of relatively massive, flat-faced bars of electrode material, a relatively thin strip of good conducting metal using a bond which is thermally conductive but electrically insulating, and then machining the end of the composite electrode into a convergent tip in which the faces of the electrodes have a thickness of the same order of magnitude as the thickness of the strip of good conducting metal which has been used. More specifically, it is preferred to split a relatively massive rod of electrode material longitudinally into two D-shaped halves. Thus in a practical case, starting with a copper rod of 0.50" diameter, such rod may be longitudinally split by a suitable saw or cutter to form two electrodes, the facing surfaces being ground perfectly flat. Following this a conductive strip of metal having a thickness on the order of 0.010", and a width which is the same as the diameter of the original stock, is coated, on its sides, with a thin layer of insulation and intimately bonded between the two electrodes. The latter restores the assembly to cylindrical shape as indicaed by the dot-dash outline 50 in FIG. 7. Following this the end of the electrode is relieved by appropriate machining so that it has the generally frustoconical shape shown in FIG. 1. During the relieving step, it will be noted, the radial thickness of each electrode is reduced substantially, for example, from 0.25" to 0.01" at the end face. Note that while the edges of the central heat conducting layer are trimmed away its thicknes, in the final electrode assembly, is maintained the same. If it is considered that there is risk of short circuiting between the layers as a result of a grinding burr, particularly where soft metals are employed, the central layer 20 may be preshaped at its end into a pointed formation corresponding to the profile of the final tip but lying within the final profile to provide a recess as indicated at 51 in FIG. 8 so that no material is removed from the central layer when the composite electrode is ground to its final conical shape.

The above described composite electrode, while providing a compact tip, is nevertheless, rigid and monolithic. In accordance with one of the more detailed aspects of the present invention the composite elecrode may be modified, where desired, to provide for individual springing of the two conducting portions of the electrode. Thus, instead of providing a physical bond at both sides of the central layer, the bond may be provided at one side only so that the other electrode is left relatively floating.

Referring, for example, to FIG. 6, the junction A—A may be made electrically insulated but physically non-connected. For example, insulation may be provided in the form of a thin layer of aluminum oxide but adhesive may be omitted for all or the major portion of the length of the composite electrode. It is found that there is sufficient endwise "spring" in the usual electrode material so that in response to the pressure applied during the welding operation the two welding tips 11 and 12 may move relatively endwise the small amount which may be necessary to accommodate the electrode face to the surface of the work. Provided that the area of the junction is substantial and provided that the adjacent members are closely spaced, a substantial amount of heat from the central layer may be transmitted across the gap.

In the above discussion it has been stated that the insulation at the two bonding surfaces is both thin and heat-conductive. Anodizing provides adequate electrical insulation even when extremely thin, and may be employed where the central heat-removing layer is aluminum or other good-conducting metal or other metal alloy capable of forming an insulating, mechanically strong oxide. With regard to the adhesive nature of the bond, a number of suitable heat- resistant adhesives are available to one skilled in the art. For example, an epoxy resin may be used, with the original sandwiching of the members being done at high pressure so that all of the adhesive material, except for an extremely thin film on the order of 0.0001" is squeezed out, following which the adhesive in the film is cured at a suitable curing temperature. Adhesives having properties similar to that sold by Eastman Kodak Co. under the name Eastman 910, either alone or impregnated in a layer of tissue, may also be used.

We claim as our invention:

1. In a composite electrode construction for welding together work consisting of a pair of thin superimposed terminal strips of conducting metal, the combination comprising first and second electrodes spaced side by side and having a tip portion presenting flat faces lying in the same plane, and a third member formed of metal having good thermal conduction properties secured between the electrodes for intimate thermal conduction but electrically insulated therefrom, said electrodes and third member all flaring outwardly from the tip portion to provide a substantially augmented area for lateral heat flow and a relatively massive heat sink, said third member having a face for contacting the work which lies in the same plane as the faces of the electrodes for subtracting heat from the surface of the work in the region between the electrodes.

2. In a composite electrode construction for welding together work consisting of a pair of thin superimposed terminal strips of conducting metal, the combination comprising first and second electrodes each having a body portion and a tip portion and spaced generally parallel to one another with the tip portions defining an end face for contacting the work, a central layer of metal having high thermal conductivity filling the space between the electrodes and having a flat tip portion extending down flush with the end face thereof, and bonding layers on the opposite sides of the central layer providing electrical insulation with respect to the electrodes but being sufficiently thin so as to offer low resistance to the flow of heat from the central layer into the electrodes so that the heat generated at the surface of the work between the electrodes is conducted upwardly into the central layer and the electrodes.

3. In a composite electrode construction for welding together work consisting of a pair of thin superimposed terminal strips of conducting metal, the combination comprising a cylindrical body made up of two electrodes of relatively massive cross section having between them a relatively thin central layer of good conducting metal, electrically insulating bonds interposed between the electrodes and the central layer and sufficiently thin so as to provide a good thermally conductive path laterally in the electrode, the body having a relieved tip portion of converging cross section terminating in a flat welding face in which the radial thickness of each electrode is of the same order of magnitude as the thickness of the central layer.

References Cited

UNITED STATES PATENTS

| 3,234,354 | 2/1966 | Penberg. | |
| 3,238,351 | 3/1966 | Hill | 219—86 |
| 3,283,119 | 11/1966 | Hromadka | 219—85 |

RICHARD M. WOOD, *Primary Examiner.*

C. CHADD, *Assistant Examiner.*

U.S. Cl. X.R.

219—91